W. TORRANCE.
SOD CUTTER.
APPLICATION FILED MAY 7, 1910.
1,013,332.
Patented Jan. 2, 1912.
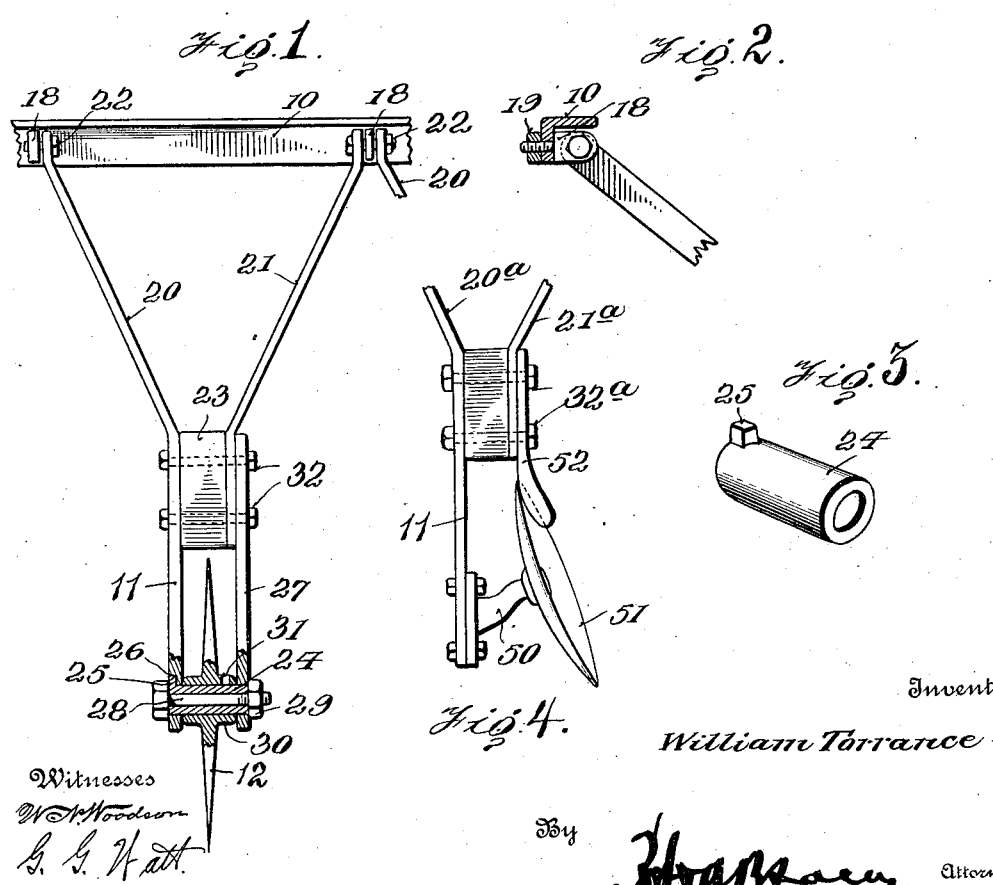

UNITED STATES PATENT OFFICE.

WILLIAM TORRANCE, OF ABBNOTT, SASKATCHEWAN, CANADA.

SOD-CUTTER.

1,013,332.   Specification of Letters Patent.   Patented Jan. 2, 1912.

Application filed May 7, 1910. Serial No. 560,087.

*To all whom it may concern:*

Be it known that I, WILLIAM TORRANCE, subject of the King of Great Britain, residing at Abbnott, Saskatchewan, in the Province of Saskatchewan, Dominion of Canada, have invented certain new and useful Improvements in Sod-Cutters, of which the following is a specification.

This invention relates to agricultural implements, and refers to an improved machine adapted to break uncultivated ground and to prepare the ground for the turning plow.

This invention has for an object to simplify and improve the construction and increase the efficiency and utility of a device of this character.

For a full understanding of the invention, reference is to be had to the following description and accompanying drawings, in which:—

Figure 1 is a view partly in section, of one of the hinged brackets for supporting one of the colters. Fig. 2 is a detail fragmentary view of the upper end of one of the brackets, disclosing its hinged connection to the frame. Fig. 3 is a detail perspective view of the bushing for supporting the colter; and, Fig. 4 is a slight modification of the hinged bracket for supporting a disk.

Corresponding and like parts are referred to in the following description, and indicated in all the views of the accompanying drawings by the same reference characters.

The improved device is designed to be applied to the supporting frame of a disk plow, disk cultivator, or like machine, and comprises a supporting frame of suitable construction a portion of which is represented conventionally at 10 and provided with rearwardly extending eye bolts 18 secured in place by nuts 19 to provide means for the swinging connection of a plurality of brackets, one of which only is shown in full in Fig. 1, but it will be understood that any required number of brackets may be employed. Each bracket comprises two rearwardly extending arms 20—21 converging toward their rear ends and connected by bolts 32 to a spacer 23. The arms are pivotally united by bolts 22 to the eye bolts 18 and swing thereon as shown. Preferably the bolts 22 are utilized to connect two of the brackets 20—21 to the member 10 as indicated at the right of Fig. 1. The arm 20 is extended rearwardly of the block 23 as shown at 11, while a supplemental arm 27 is connected to the rear portion of the arm 21 by the same bolts 32 by which the arms are united to the block. At their rear ends the extended portion 11 and the supplemental arm 27 are perforated to receive a transverse sleeve 24, the sleeve having a lug 25 at one end fitting in a socket 26 in the extension 11 of the arm 20 to prevent the sleeve from rotating in the arms. A tie bolt 28 extends through the sleeve 24 and is provided with a clamp nut 29 at one end. By this means the extension 11 and the supplemental arm 27 together with the sleeve 24 are firmly coupled together. The sleeve 24 forms a bearing for the hub 30 of a rolling colter 12. The hub 30 is provided with an oil hole represented at 31 to provide for the lubrication. It will be noted that the supplemental member 27 is readily detached by releasing the nuts of the bolts 32 and 28, to detach the colter when required.

In Fig. 4, a modified construction is shown in which the rolling colter is arranged to operate obliquely to the longitudinal plane of the bracket, to enable the device to be employed as a disk cultivator. In this modified structure the diverging arms are indicated by the characters $20^a$ and $21^a$, the spacer block by the character $23^a$ and the connecting bolts by the character $32^a$. In this modified structure the sleeve 24 and the clamp bolt 28 are dispensed with and a diagonal or oblique standard 50 connected to the extension $11^a$ which corresponds to the extension 11 of the structure shown in Fig. 1. The disk cultivator represented at 51, is mounted for rotation upon the standard 50. In the modified structure the supplemental member 27 is dispensed with and a scraper device 52 connected to the arm $21^a$ by the clamp bolts $32^a$, the scraper operating against the face of the colter 51.

The modified structure shown in Fig. 4 provides for converting the sod cutter into a disk harrow or cultivator in a very short period of time, to adapt the machine to various stages in the cultivation of the land. The general structure of the machine is not altered by the changes further than to displace the extension arm 27 and the colter 12 and its attachments and substitute therefor the standard 50, the colter 51 and the scraper 52.

The improved device is simple in construction, can be cheaply manufactured and operates effectually for the purposes described.

Having thus described the invention, what is claimed as new is:—

A supporting frame, a plurality of brackets each comprising a center block and diverging side members, said side members being connected to swing at their upper ends to said frame and one of said side members being extended beyond the block, means for coupling a colter to said extended side member, a guard member, and means for detachably connecting said guard member to said bracket members and block.

In testimony whereof, I affix my signature in presence of two witnesses.

WILLIAM TORRANCE. [L. S.]

Witnesses:
GEORGE R. MCCLURE,
HARRY TURNER.

---

Copies of this patent may be obtained for five cents each, by addressing the "Commissioner of Patents, Washington, D. C."